(12) United States Patent
Jones et al.

(10) Patent No.: US 8,341,193 B2
(45) Date of Patent: Dec. 25, 2012

(54) DATA VERSIONING THROUGH DATA TRANSFORMATIONS

(75) Inventors: Jeffrey D. Jones, Loomis, CA (US);
Umesh Madan, Bellevue, WA (US);
Sean Patrick Nolan, Bellevue, WA (US); Daniel J. Young, Sammamish, WA (US); Gaurav Kalmady, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 12/723,302

(22) Filed: Mar. 12, 2010

(65) Prior Publication Data

US 2011/0173168 A1 Jul. 14, 2011

Related U.S. Application Data

(60) Provisional application No. 61/294,366, filed on Jan. 12, 2010.

(51) Int. Cl.
*G06F 17/30* (2006.01)
(52) U.S. Cl. .......................................... 707/803
(58) Field of Classification Search ............... 707/1, 101, 707/803; 348/79; 715/501.1
See application file for complete search history.

(56) References Cited

U.S. PATENT DOCUMENTS

| 6,704,736 | B1 | 3/2004 | Rys et al. |
| 7,437,662 | B1 | 10/2008 | Yu et al. |
| 2002/0069192 | A1* | 6/2002 | Aegerter ........................... 707/1 |
| 2002/0154216 | A1* | 10/2002 | Yahiro ............................. 348/79 |
| 2004/0243926 | A1* | 12/2004 | Trenbeath et al. ........... 715/501.1 |
| 2006/0161840 | A1 | 7/2006 | Cohen et al. |
| 2007/0203931 | A1* | 8/2007 | Ukelson et al. ................ 707/101 |
| 2007/0239762 | A1 | 10/2007 | Farahbod |
| 2008/0046292 | A1 | 2/2008 | Myers et al. |
| 2008/0104615 | A1 | 5/2008 | Nolan et al. |
| 2009/0307137 | A1 | 12/2009 | White et al. |
| 2011/0082711 | A1* | 4/2011 | Poeze et al. ........................ 705/3 |

OTHER PUBLICATIONS

Beuchelt, Dingwell, Gregorowicz, Sleeper, "hData—A Simple XML Framework for Health Data Exchange", retrieved on Dec. 24, 2009 at <<http://www.balisage.net/Proceedings/vol3/html/Beuchelt01/BalisageVol3- Beuchelt01.html>>, The MITRE Corporation, Proceedings of Balisage: The Markup Conference, 2009, pp. 1.

Chien, Tsotras, Zaniolo, "XML Document Versioning", retrieved on Dec. 23, 2009 at <<http://www.cs.ucla.edu/~zaniolo/papers/sigmod_record01.pdf>>, ACM SIGMOD Record, Special section on advanced XML data processing, Sep. 2001, pp. 46-53.

Newell, "Notes on Versioning of XML schemas", retrieved on Dec. 28, 2009 at <<https://wiki.ucar.edu/download/attachments/13927814/VersioningNotes.pdf>>, MIT Lincoln Laboratory, Aug. 29, 2007, pp. 1-4.

"XML Schema Versioning", retrieved on Dec. 23, 2009 at <<http://www.xfront.com/Versioning.pdf>>, Jun. 15, 2009, pp. 1-9.

* cited by examiner

*Primary Examiner* — Etienne Leroux
(74) *Attorney, Agent, or Firm* — Lee & Hayes, PLLC

(57) ABSTRACT

In response to receiving a request for data stored according to a first version of a data type, a second version of the data type supported by the requester is determined, and the requested data is transformed from the first version to the second version to provide access to the data.

20 Claims, 8 Drawing Sheets

Versions for an Exemplary Data Type

| First Version (Application A) 302-1 | Second Version (Application B) (Application E) 302-2 | Third Version (Application C) 302-3 | Fourth Version (Application D) 302-4 | Fifth Version (Application E) 302-5 |
|---|---|---|---|---|
| Element 1 | Element 1 | Element 3 | Element 1 | Element 1 |
| Element 2 | Element 2 | Element 1 | Element 2 | Element 2 |
| | Element 3 | Element 2 | | Element 3 |
| | | | Element 4 | |
| | | | | Element 5 |

Fig. 3

↑ - INSTANCE IS MAPPED UP TO A NEWER VERSION
↓ - INSTANCE IS MAPPED DOWN TO AN OLDER VERSION

| | \multicolumn{5}{c}{DATA INSTANCE VERSIONS RETURNED FROM DATABASE FOR A DATA TYPE} |
|---|---|---|---|---|---|
| | VERSION 1 | VERSION 2 | VERSION 3 | VERSION 4 | VERSION 5 |
| APPLICATION A V1 | V1 | V2↓V1 | V3↓V2↓V1 | V4↓V3↓V2↓V1 | V5↓V4↓V3↓V2↓V1 |
| APPLICATION B V2 | V1↑V2 | V2 | V3↓V2 | V4↓V3↓V2 | V5↓V4↓V3↓V2 |
| APPLICATION C V3 | V1↑V2↑V3 | V2↑V3 | V3 | V4↓V3 | V5↓V4↓V3 |
| APPLICATION D V4 | V1↑V2↑V3↑V4 | V2↑V3↑V4 | V3↑V4 | V4 | V5↓V4 |
| APPLICATION E V2, V5 | V1↑V2 | V2 | V3↑V4↑V5 | V4↑V5 | V5 |

Fig. 5

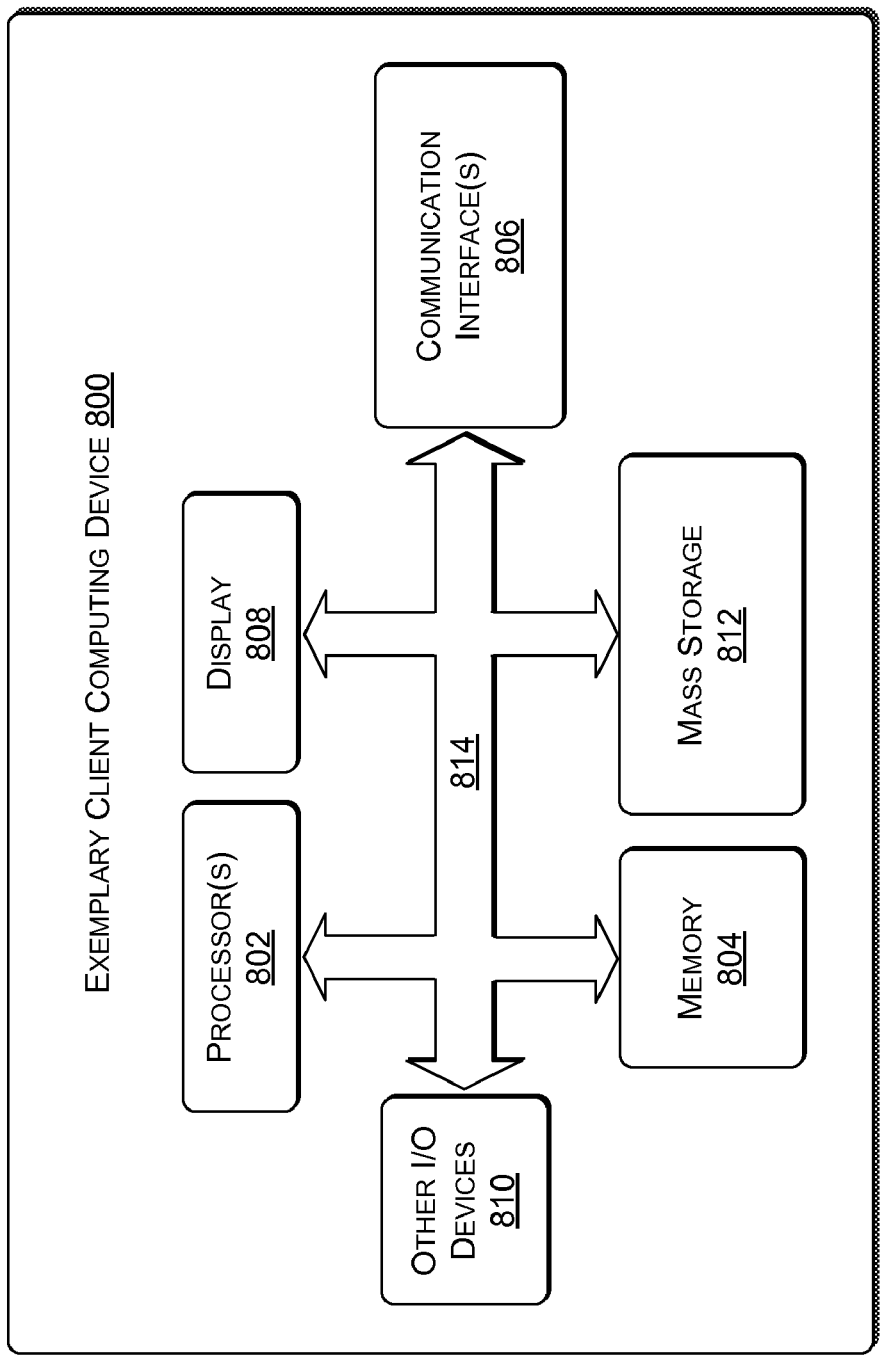

DATA VERSIONING THROUGH DATA TRANSFORMATIONS

CROSS-REFERENCE TO RELATED APPLICATION

This application claims the benefit of U.S. Provisional Patent Application No. 61/294,366, filed Jan. 12, 2010, to the same inventors as herein, the entire disclosure of which is incorporated herein by reference.

BACKGROUND

Some types of databases are intended to maintain electronic data for extremely long periods of time. For example, health record databases may maintain health data for individuals on an indefinite basis, such as for the life of the individual or longer. Similarly, some financial record databases, due diligence databases, and other types of databases also are used to maintain records on an indefinite basis or for very long periods of time.

In these types of databases, it is desirable for the data to be maintained in a complete and accessible form despite changes that may occur over time in the types of computer programs and equipment that are used to provide the data, access the data or modify the data. For example, because these databases maintain data in an electronic format, the applications used to store and access the data can change as applications become obsolete or new technologies are created. In particular, a data type may be stored initially using a particular format or schema of data elements corresponding to a particular application. However, over time, the data of that data type might also be stored or formatted using other formats and schemas that contain new or different data elements, different ordering of data elements, or the like. When such changes occur, data that was originally stored in a first format by an application that is now obsolete may not be able to be accessed or read by any currently available applications, or data that is created by new applications may not be backward compatible with some existing applications. However, as mentioned above, certain types of data are expected to remain accessible, regardless of the length of time that has elapsed, and regardless the particular application or schema that was used to originally store the data.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for data transformation of data in different versions of a data type to achieve accessibility to the data regardless of the version of the data present in a database.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 3 illustrates an example of versions for a data type according to some implementations.

FIG. 5 illustrates an exemplary depiction of data versioning through data transformations according to some implementations.

FIG. 8 illustrates an exemplary client computing device according to some implementations.

DETAILED DESCRIPTION

Data Versioning

Figure 1:
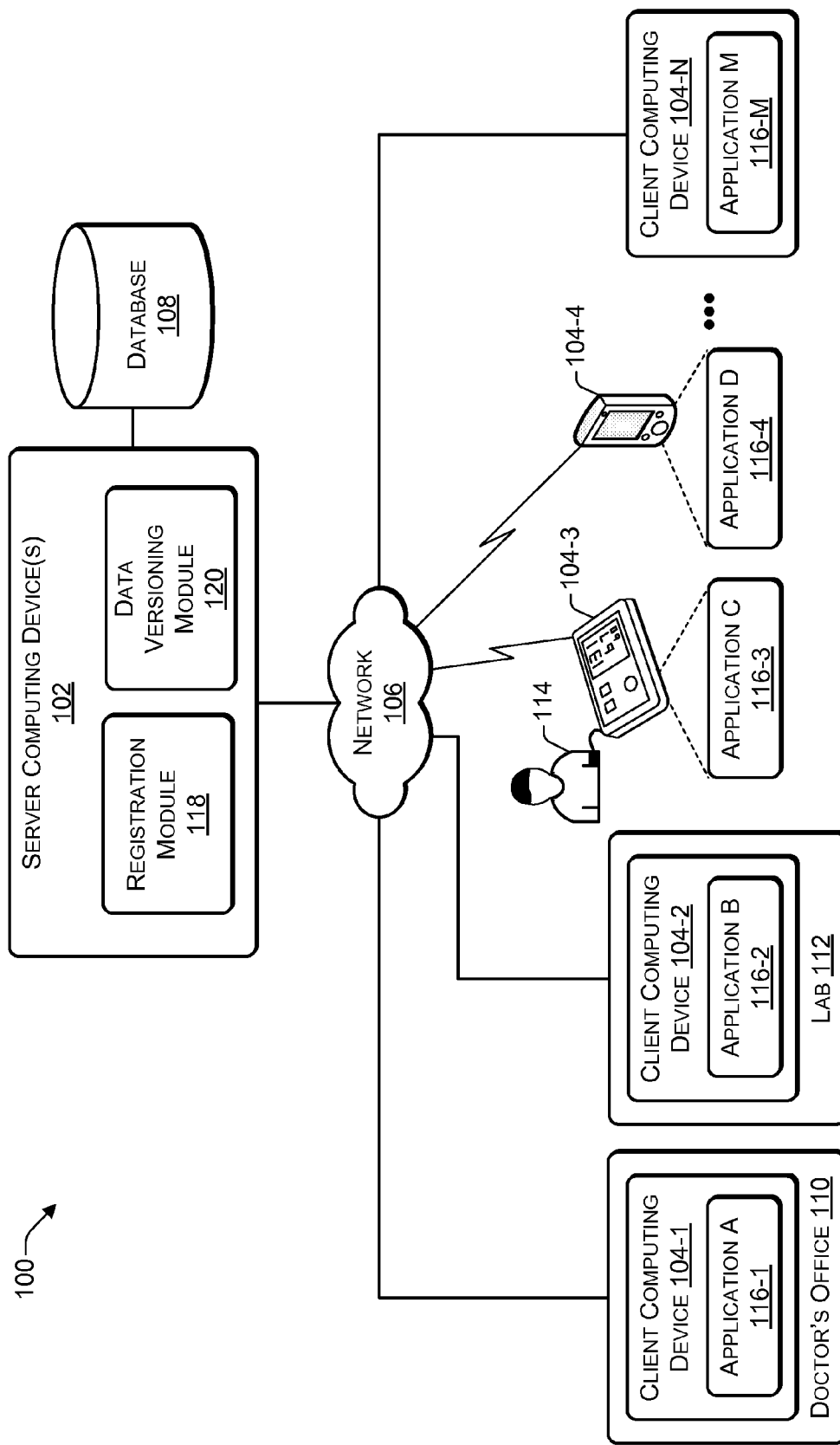
FIG. 1 illustrates an exemplary system architecture according to some implementations disclosed herein.

Some implementations herein transform data to match a version or format specified in a registration established between a database provider and an application requesting access to the data. For example, data may be initially stored in the database according to an original version in which the data was created. In these implementations, when the data is requested by another application, a registration corresponding to the requesting application is used to determine a particular version in which the data is to be formatted in response to the request. Thus, if the version in which the data is originally stored and the particular version of the requesting application do not match, the data is transformed to match the particular version corresponding to the registration of the requesting application. Accordingly, implementations herein allow new versions to be defined for existing data types, such as when adding data elements to existing data types, or the like. However, registrations of existing applications can continue to be honored for multiple versions defined for a data type by performing data transformations to respective versions corresponding to each application able to access the data type.

As an example, some implementations include XML (extensible markup language) schemas for storing data and for transforming the data between various versions. The XML schemas herein define a "grammatically correct" structure for data of a particular data type and version. For example, the XML schemas can define what data elements and attributes are included in the data type, the format of the elements, the order of the elements, whether some elements are child elements, whether some elements have default or fixed values, and the like. Consequently, implementations herein enable data to be stored and accessed by an application according to an original or initial XML schema used by the application, rather than requiring data entered into the database to be translated into a single standardized format, or the like. An example of suitable XML schema language is W3C XML Schema 1.0 developed by the World Wide Web Consortium, also referred to as the XSD specification.

Some implementations provide for programmatic access and storage of information as schematized XML data, while accommodating changes to the schemas for data types. For example, in the situation of a health care record database, if a data type for blood pressure is initially schematized to contain just systolic blood pressure and diastolic blood pressure as the only data elements, data may be created and stored in the database using this schema. However, it later may be decided that pulse is also an important data element to include in the blood pressure data type Implementations described herein enable this additional information to be included in the blood pressure data type for storage with the existing blood pressure data without causing a failure in applications expecting to only get data containing systolic and diastolic pressure. For example, this can be useful in an environment in which the data is centrally located and shared by multiple applications, but the multiple applications that create and access the data can be written by any number of different entities. Consequently, through the implementations herein, the data created and stored by any application having a registration with the database can continue to be readable by all applications having a registration with the database and having permission to access to that data.

According to some implementations, each data type may be schematized using an XML Schema Definition (XSD), and data may be validated against that schema to ensure that the data can be parsed by applications connecting to the database. Furthermore, as an example, over time, some of these original schemas may be found to be inadequate in some way or may otherwise be changed. For instance, the original schemas may be missing data elements, or data elements that were once mandatory may have become optional, etc. Consequently, valid reasons may exist for changing the schema for a data type. However, because applications are able to read and parse the data stored in the database by validating the data using a schema corresponding to each application, changing the schema could cause a malfunction in applications attempting to access data stored under different schemas. Rather than creating a new type of data with a new schema (and new namespace), implementations herein enable applications to read data of a data type that has undergone a schema change to enable access to both old and new versions of the data of the data type. According to some implementations, this may be accomplished by defining transformations that take data of the original schema version and up-convert the data to the new schema. Conversely, implementations herein also define transformations that take data stored according to the new schema version and down-convert the data to the old schema version for access by an application using the old schema. This allows data which is stored in either version to be converted and returned to an application that is expecting a certain schema.

In certain implementations, applications may configure the types of data that the applications access on a database platform through actual data creation and configuration. These configurations can then be leveraged into a registration setting forth the schema versions that the application can read and parse. For example, if a particular application is configured to use a first version of a data type, then implementations herein can use the transforms to convert any data of that data type created using a second version of the schema down to the first version of the schema before returning the data to the particular application. Conversely, if the particular application is configured for a second schema version of the data type, implementations herein can use a transform to up-convert any data of that data type which is stored with the first schema version to the second schema version. This functionality can ensure that various different applications are able to access centrally stored data regardless of which schema version of a data type a particular application is able to parse.

Additionally, as discussed above, in some implementations, the registration of the application is used for determining a schema version for the application, and the data is automatically transformed into a form according to the determined schema version. However, in additional implementations, the application may explicitly specify a particular schema version out of the available schema versions, regardless of the registration for that application or the schema versions included in the registration. In this case, the data can be transformed according to the specified schema version even if the specified version does not match the registration for the application. Further, an application might support multiple schema versions, and may be registered for these multiple versions. Other variations will also be apparent in light of the disclosure herein.

Exemplary System

FIG. 1 illustrates a system 100 depicted for explanation purposes for describing exemplary implementations herein. In the illustrated example, system 100 is depicted as providing a cloud-based health record data storage and access platform as a particular example for discussion. However, other implementations herein are not limited to a cloud-based or health record platform, and can extend to numerous other types of data storage platforms, database management systems, enterprise data systems, storage networks, and the like, for storing various and diverse types of data. Thus, while a particular system architecture is illustrated in FIG. 1, other suitable architectures may also be used, and implementations herein are not limited to any particular system architecture.

In the illustrated implementation, the system 100 includes one or more server computing device(s) 102 in communication with a plurality of client or user computing devices 104-1 . . . 104-N through a network 106 or other communication link. In some implementations, server computing device 102 exists as a part of a data center, server farm, or the like, and is able to act as a component for providing access to a database 108. The system 100 can include any number of the server computing devices 102 in communication with any number of client computing devices 104. For example, in one implementation, network 106 includes the World Wide Web implemented on the Internet, including numerous, servers, databases, personal computers (PCs), workstations, terminals, mobile devices and other computing devices spread throughout the world and able to communicate with one another. Alternatively, in another possible implementation, the network 106 can include just a single server computing device 102 in communication with one or more client devices 104 via a LAN (local area network) or a WAN (wide area network). Thus, the client computing devices 104 can be coupled to the server computing device 102 in various combinations through wired and/or wireless networks, or any other networking technology, using one or more protocols, such as, for example, a transmission control protocol running over Internet protocol (TCP/IP), or other suitable protocols.

In some implementations, client computing devices 104 are personal computers, workstations, terminals, mobile computing devices, PDAs (personal digital assistants), cell phones, smartphones, laptops or other computing devices having data processing capability. In the illustrated example, client computing device 104-1 is a computer at a doctor's office 110, while client computing device 104-2 is a computer at a lab 112. Furthermore, computing and communication capabilities can be included in numerous other types of devices, such as a blood pressure monitor as client computing device 104-3, a smartphone or PDA as client computing device 104-4, and so forth. As further non-limiting examples, in the health record platform, client computing devices may also include laboratory equipment, other portable testing devices such as blood sugar devices, heart rate monitors and peacemakers, exercise equipment, and computing devices of insurance providers, hospitals, ambulances, dietitians, pharmacists, personal trainers, and of course, the patients themselves. Consequently, from the foregoing partial listing, it may be seen that numerous different entities and a variety of different computing devices may have cause to access at least a portion of the records for a particular individual 114, such as for adding or retrieving data, and each of these computing devices 104 may use an application 116-1 . . . 116-M for executing the access. Further, at least some of these applications 116-1 . . . 116-M for accessing, modifying or storing the data are different from others of the applications 116-1 . . . 116-M.

Consequently, according to some implementations, to ensure that each application 116 is able to fully access all the data in database 108 that it is permitted to access, server computing device 102 may include a registration module 118 for establishing an access arrangement or contract with each application 116. For example, the registration can specify a data format or version for each application. Server computing device 102 may further include a data versioning module 120 for ensuring that the data is transformed into the proper format or version for a particular application 116 that desires to access the data. The registration module 118 and the data versioning module 120 are discussed additionally below.

Accessing Data of a Data Type

As an additional example, building on the blood pressure example mentioned above, the doctor's office 110 may enter the blood pressure information of the individual 114 following an office visit using a first application A 116-1 that uses a first version of the blood pressure data type. The lab 112 doing the individual's blood work may subsequently access this data using a second application B 116-2 that expects to access the data according to a second version of the blood pressure data type. Furthermore, the individual 114 may have a home blood pressure monitor 104-3 that runs a third application C 116-3 that automatically uploads the blood pressure data of the individual 114 to the database each time the individual measures his or her blood pressure, and this application C 116-3 may include a third data version that is different from the first two versions. For example, application C may include the individual's pulse in addition to the diastolic and systolic pressures when uploading the blood pressure data. Furthermore, another computing device 104-4 may be using a fourth application D 116-4 that uses a latest format, e.g., a fourth version of the data type.

For instance, suppose that fourth application D 116-4 includes a feature for plotting the history of the individual's 114 blood pressure readings for diagnostic purposes or the like. It is desirable that the fourth application D 116-4 be able to access all the blood pressure data for the individual stored in the database 108 over time, regardless of the version of the data type that was used to store the data. Consequently, when the fourth application D 116-4 attempts to access the data stored or modified by any of applications A, B, C data versioning module 120 up-converts the data to the fourth version to provide access to the data to the fourth application D 116-4.

Figure 2:
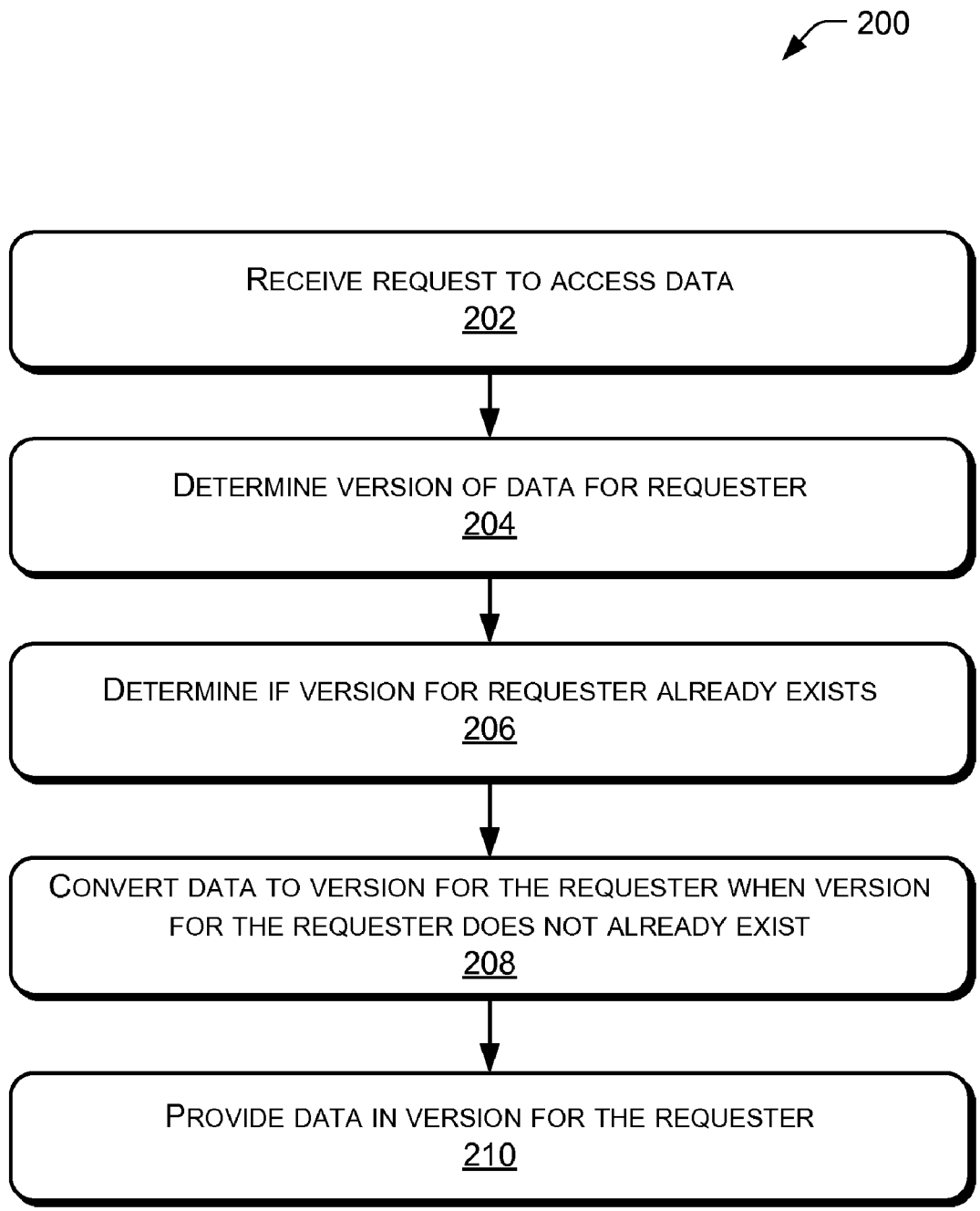
FIG. 2 illustrates a flow diagram of an exemplary process for providing data according to some implementations.

FIG. 2 illustrates a flow diagram of an exemplary process 200 according to some implementations for accessing different versions of data of a data type in a database, such as in the platform described above with respect to FIG. 1. In the flow diagram, the operations are summarized in individual blocks. The operations may be performed in hardware, or as processor-executable instructions (software or firmware) that may be executed by a processor. Further, the process 200 may, but need not necessarily, be implemented using the system of FIG. 1. Consequently, by way of explanation, and not limitation, the process 200 is described in the context of the system of FIG. 1.

At block 202, a request for access to data of a data type is received. For example, server computing device 102 may receive a request for access to data from one of the applications 116 described above, such as application D 116-4 requesting to access blood pressure data in the example described above.

At block 204, the version of the data corresponding to the requester is determined. In the example, the server computing device 102 determines which version of the data is compatible with application D 116-4. As will be described additionally below, registration module 118 may contain a registration corresponding to the requester that indicates which version of the data type is used by application D 116-4. Alternatively, the requester may explicitly request a particular version of the data type regardless of registration.

At block 206, a check is made to determine whether the version to be returned to the requester already exists. For example, if the version for the application matches the version already stored in the database, then that data version may be returned with no data transformation required. Furthermore, when the version for the application is different from the version stored in the database, a check can be made to determine whether the data has already been transformed to the desired version, such as in response to a previous request. In such a case, the transformed version of the data may be stored in a cache memory, or the like, and may be retrieved from the cache without having to carry out an additional transformation of the data.

At block 208, when the version of the data for the requester does not already exist, the data is converted to the version that is used by or requested by the requester. For example, as will be described additionally below, data stored according to different versions, such as the first version, the second version, and the third version described above, can be up-converted by the data versioning module 120 to the fourth version in response to the request. Similarly, in the case of a request from an application that uses, for example, the first version, any data stored according to the second, third or fourth versions can be down-converted to the first version. Further, it should be noted that in implementations herein, except in the case of updates to data, during conversion, the original data itself typically remains stored in the database in the original version in which the data was created, and the converted data is produced by copying the original data into the format of the desired version on the fly in response to the request to access the data.

At block 210, the requested data is provided to the requester in the version used by or requested by the requester. For example, this can include any data that already exists in the version used by the requester in addition to data converted from other versions into the version used by the requester. Consequently, from the foregoing description, it may be seen that implementations herein provide for continued access to stored data regardless of the original format or version that was used to store the data initially.

Exemplary Data Type

FIG. 3 illustrates a table 300 depicting versions 302-1 through 302-5 of an exemplary data type. For example, a database may have a large number of different data types stored in the database, with each data type being stored according to a particular schema. For instance, in the health platform example described above, data may be stored as XML according to various data types such as the blood pressure data type previously discussed, lab results, allergies, body metrics (e.g., height, weight, body fat percentage), immunization records, radiology records, pharmaceutical and prescription medication records, chronic illnesses, accidents and bodily injuries, hospital stays, pregnancies, insurance information, and numerous other medical conditions, records, and information for each individual having data in the database.

Any schema change to a data type can result in a new version of the data type. For example, a new version may be created when optional elements/attributes are added to the schema; when mandatory elements/attributes are added to the schema; when optional elements/attributes are removed from the schema; when mandatory elements/attributes are removed from the schema; when elements in the schema are reordered; when a data type is split into two or more data types; when multiple data types are joined into a single data type; or any combination of the above.

In the example illustrated in FIG. 3, versions for an exemplary data type are shown. A first version 302-1 may initially be established for the data type, with the first version including element 1 and element 2 as the data elements of the data type. Subsequently, a second version 302-2 may be established for the data type that also includes element three as an additional data element of the data type. Further, a third version 302-3 may be established for the data type that changes the order of the data elements in the data type. Subsequently, a fourth version 302-4 of the data type may be established that eliminates element 3 and adds a new element, element 4. Finally, a latest fifth version 302-5 of the data type may be established that includes element 1, element 2, element 3, and a new element, element 5. Further, as discussed previously, one or more different applications may use each of these versions 302-1 ... 302-5, as illustrated. For example, an application E may be compatible with both the second version 302-2 and with the fifth version 302-5. Furthermore, while the versioning in FIG. 3 is illustrated as being based on data elements and their ordering, the versioning can also be based upon any of the other factors discussed above, such as attributes, making an optional element mandatory, etc.

Establishing Registrations

As mentioned above, when an application desires to store or access data in the database 108, the application can first register with the database provider to establish a registration that defines the rights of the application for creating, storing, accessing and/or modifying data in the database. Thus, the registration can include the data types and corresponding versions that each application uses. For example, the registration can have a description of the particular data types and corresponding schemas that the application will use for storing, reading and/or parsing data in the database.

Figure 4:
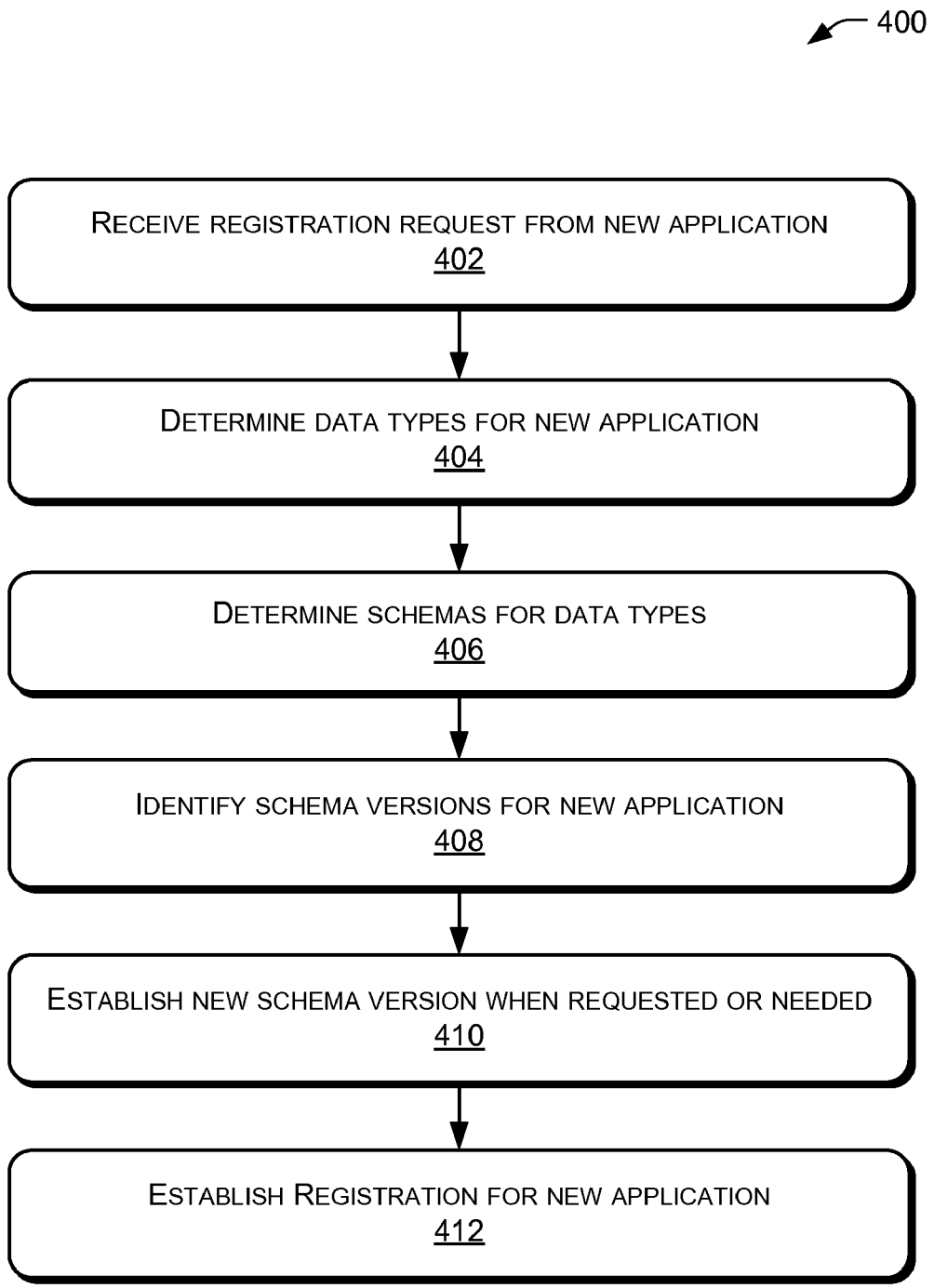
FIG. 4 illustrates a flow diagram of an exemplary process for establishing a registration according to some implementations.

FIG. 4 illustrates a flow diagram of an exemplary process 400 according to some implementations for establishing a registration to store and access data in a database. In the flow diagram, the operations are summarized in individual blocks. The operations may be performed in hardware, or as processor-executable instructions (software or firmware) that may be executed by a processor.

At block 402, a request for registration to access the database is received for a new application. Under one scenario, an entity, such as a software manufacturer that authors the application, may register for a blanket registration for all copies of the application that will be sold to consumers. Alternatively, under another scenario, a single instance of an application may register for an individual registration that applies just to the particular instance of the application. Numerous other variations will also be apparent to those of skill in the art in light of the disclosure herein.

At block 404, the data types for the new application are identified. For example, the database provider can define the various data types and determine from the request which of the data types the application will access in the database.

At block 406, the schemas that the new application will be using are determined for each of the identified data types. For example, the database provider can define the schema versions for the various data types. An application can then register which data types and schema versions are supported by the application.

At block 408, the schemas proposed to be used by the new application are compared with the existing schemas for each identified data type for identifying the schema versions supported by the application.

At block 410, in some cases, an application may desire to use a schema version that does not match the existing schema versions available for one or more data types. In such a case, a new schema version can be defined by the database provider and published for use by the requesting application and other applications that may desire to use the new schema version.

At block 412, when the data types and corresponding schema versions have been established for the new application through registration, the new application is able to access those data types in the database, including data stored using prior versions of schemas for the data types. Such access is granted, of course, assuming that the application is otherwise authorized to access the data, is in accordance with proper security requirements, and the like.

Furthermore, during registration, applications can be authorized with any of CRUD (create, read, update, delete) permissions on particular data types. Further, in some implementations, applications can be authorized with the CRUD permissions on any version of a data type even though the applications are registered for only one or more particular versions. This allows an application to upgrade the version that the application is using without requiring the application to be reregistered.

Versioning through Data Transformations

FIG. 5 illustrates a table 500 that provides examples of how versions of data are transformed, such as in response to access requests. For example, when a new schema is established for a data type, such as for using data according to a second version V2 of a schema, rather than a first version V1 of the schema, the data base provider creates an algorithm for up-converting the data from V1 form to V2 form and for down-converting data in V2 form to V1 form. Further when another new schema is established for a third version V3 of the schema, the data base provider creates an algorithm, for up-converting from V2 to V3 and for down-converting from V3 to V2. These versioning algorithms can be transitive, such that data can be converted from V1 to V2 to V3 or from V3 to V2 to V1, as desired. Thus, according to some implementations, there is no requirement to create separate algorithms for up-converting from V1 to V3 or down-converting from V3 to V1, since the system is able to build on previously-created algorithms. However, in other implementations, specific algorithms may be created for each conversion, such as for converting directly from V1 to V5, for example.

As illustrated in example entries 502, 504, 506, 508, 510 of FIG. 5, when a particular application accesses data that is in a version that already matches a schema version used by that application, as expected, no conversion of the data is performed. For example, as shown at entry 506, when application C, using the third version V3 of the schema accesses data stored according to the third version V3, the V3 data is returned with no conversion. However, when application C wants to access data that exists, for example, in version V1, that data is up-converted (as indicated in FIG. 5 by an up arrow) to version V2 and then up-converted to version V3.

Similarly, when application C accesses data that exists according to the fifth version V5, the data is down-converted (as indicated in FIG. 5 by a down arrow) from V5 to V4 to V3.

The following provides an example of instructions for up-converting data from an older schema version to a newer schema version:

```
<?xml version="1.0" ?>
- <xsl:stylesheet xmlns:xsl="www.w3.org/1999/XSL/
    Transform" version="1.0">
    <xsl:variable name="version-type-id" select=
        "'cd3587b5-b6e1-4565-ab3b-1c3ad45eb04f'" />
    <xsl:variable name="version-type-name" select=
        "$sz-local-Immunization" />
  - <xsl:template match="immunization">
    - <xsl:element name="immunization">
        <xsl:copy-of select="name" />
        <xsl:copy-of select="administration-date" />
        <xsl:copy-of select="administrator" />
      - <xsl:if test="manufacturer">
        - <manufacturer>
          - <text>
              <xsl:value-of select="manufacturer" />
            </text>
          </manufacturer>
        </xsl:if>
        <xsl:copy-of select="lot" />
        <xsl:copy-of select="route" />
        <xsl:copy-of select="expiration-date" />
        <xsl:copy-of select="sequence" />
        <xsl:copy-of select="anatomic-surface" />
        <xsl:copy-of select="adverse-event" />
        <xsl:copy-of select="consent" />
      </xsl:element>
    </xsl:template>
  </xsl:stylesheet>
```

In the example above, the requested data (e.g., a source document) stored using the older schema is up-converted on the fly to produce transformed data (e.g., a result document) arranged according to the newer schema. In this example, most of the instructions are directed to copying the data elements (e.g., the name, administration-date, administrator, lot, route, expiration-date, sequence, anatomic-surface, adverse-event and consent elements) of the source document in the older schema to the same elements in the result document according to the newer schema. Thus, these data elements are unchanged in the newer schema. However, the newer version of the schema includes a change for the format of the manufacturer element, so that in the results document, the manufacturer is written out as a text element having the manufacturer value from the source document. Thus, the instructions provide a mapping of elements of one version to elements of another version to the extent that each version supports the elements. Accordingly, implementations herein apply a mapping technique on stored data to produce versioned data suitable for use by a requesting application. This results in applications just seeing the data in the format for which they have requested the data, even if the data actually exists in the database in a newer or older format.

As another example, the following provides an example of instructions for down-converting data from a newer schema version to an older schema version:

```
<?xml version="1.0" ?>
- <xsl:stylesheet xmlns:xsl="www.w3.org/1999/XSL/
    Transform" version="1.0">
    <xsl:variable name="version-type-id" select=
```

```
        "'3d817dbe-af42-4a9d-a553-d1298b4d08fc'" />
    <xsl:variable name="version-type-name" select=
        "$sz-local-Immunization" />
  - <xsl:template match="immunization">
    - <xsl:element name="immunization">
        <xsl:copy-of select="name" />
      - <xsl:choose>
        - <xsl:when test="administration-date">
            <xsl:copy-of select="administration-date" />
          </xsl:when>
        - <xsl:otherwise>
          - <administration-date>
            - <descriptive>
                <xsl:value-of select="$sz-local-txtUnknown" />
              </descriptive>
            </administration-date>
          </xsl:otherwise>
        </xsl:choose>
        <xsl:copy-of select="administrator" />
      - <xsl:if test="manufacturer">
        - <manufacturer>
            <xsl:value-of select="manufacturer/text" />
          </manufacturer>
        </xsl:if>
        <xsl:copy-of select="lot" />
        <xsl:copy-of select="route" />
        <xsl:copy-of select="expiration-date" />
        <xsl:copy-of select="sequence" />
        <xsl:copy-of select="anatomic-surface" />
        <xsl:copy-of select="adverse-event" />
        <xsl:copy-of select="consent" />
      </xsl:element>
    </xsl:template>
  </xsl:stylesheet>
```

In this example, the requested data (e.g., a source document) stored using the newer schema is down-converted on the fly to produce transformed data (e.g., a result document) arranged according to the older schema. Similar to the preceding example, in this example, most of the instructions are directed to copying the data elements (e.g., the name, administrator, lot, route, expiration-date, sequence, anatomic-surface, adverse-event and consent elements) of the source document in the newer schema to the same elements in the result document according to the older schema. Thus, these data elements are the same in the older schema. However, the older version of the schema uses a different format for the administration-date and the manufacturer elements, so these two elements are formatted differently in the result document created during the down conversion. Accordingly, when the result document has been created by formatting the data according to the older version, the result document is returned to the requesting application as the response to the request for data, while the data itself remains unchanged in the database.

Furthermore, in some implementations, applications may support data in two or more data types. This allows an application to get two or more instances of data in either version of the data type if the application is able to parse the two or more versions of the data type. For example, as illustrated in FIG. 5, at entry 510, application E supports both the V2 and V5 versions, but does not support versions V1, V3 or V4. Consequently, data stored in version V2 or V5 can be returned directly to application E upon request. Further, when application E requests data that is stored according to the V1 version, the data is up-converted from V1 to V2, and can then be returned to the application E. Additionally, when application E requests data that is stored according to version V3, then, according to some implementations, rather than down-converting the data to version V2, which uses just a single conversion transform step, the data is instead up-converted from V3 to V4 to V5, even though down-converting would have used fewer transforms. The up-conversion is carried out instead because the inventors herein have deduced that up-conversion typically provides good results, as later versions of a schema are more likely to include additional elements or attributes than older versions, and it is usually desirable to preserve these additional elements or attributes, thereby reducing the chance of data loss.

Additionally, if an application supports all versions of a data type, then no transformation is performed, or the application can specifically request data in any of the versions, and the data can be transformed to the requested version. Furthermore, when an application supports multiple versions, such as application E, then the application can specifically request data in either or both versions. For example, application E might request that all data be returned in both versions V2 and V5. Other variations will also be apparent to those of skill in the art in light of the disclosure herein.

Multiple Data Instances

In some implementations, more than one instance of the same data may be stored in the database. For example, both a version V2 and a version V5 of a particular data instance might be stored in the database by application E. However, in other scenarios, this may be undesirable, as the storing of what is essentially duplicate data in large quantities can waste storage space. Thus, in some implementations herein, data is stored just according to the latest version supported by the application, or the version containing the most data elements.

However, in other implementations, multiple versions of a data instance may co-exist in the database. For example suppose the same record was stored as V1 data, V2 data and V4 data. In such a case, the application-supported version that is closest but higher than the instance type version may be returned if there is a higher version. For example, if the requesting application supports version V3, then the V4 version of the data instance is down-converted to V3 and returned, rather than up-converting the V2 version. Otherwise, if there is no higher version, then the closest lower version is up-converted and returned (i.e., V2).

Updating Data Instances

According to some implementations, updates to a data instance may only be permitted if the data type version for the updated data is greater than or equal to the data type version for the current data instance in the database. For example, if an application that uses version V3 wants to update data that is stored as version V4, this may not be permitted. As discussed above, such a restriction can help prevent data loss.

Digitally Signed Data

In some implementations the database may include data that is digitally signed. Transforming digitally signed data in any manner can break the digital signature. Thus, if the database provider simply transformed all data in the database to the latest version, no applications would be able to verify the digital signatures on earlier data versions. For example, suppose that a digitally signed data instance exists as a version V3 data instance in the database. The data instance cannot be changed to another version without invalidating the digital signature. However, implementations herein enable digitally signed data to be accessed by applications that support only other versions of the data even though the digitally-signed data is not compatible with those other versions. For example, the digitally-signed data instance in the V3 version can be accessed by an application that only understands version V5 through the transformations described above by up-converting from V3 to V4 to V5. By leaving the stored data in the format in which it was originally stored and signed, the signature on the data can still be validated by the applications registered or requesting that version of the data. Consequently, the application that uses version V5 is still able access the digitally signed V3 data, and have the digital signature verified, even though the transformed data will no longer have the digital signature.

Exemplary Data Versioning Process

Figure 6:
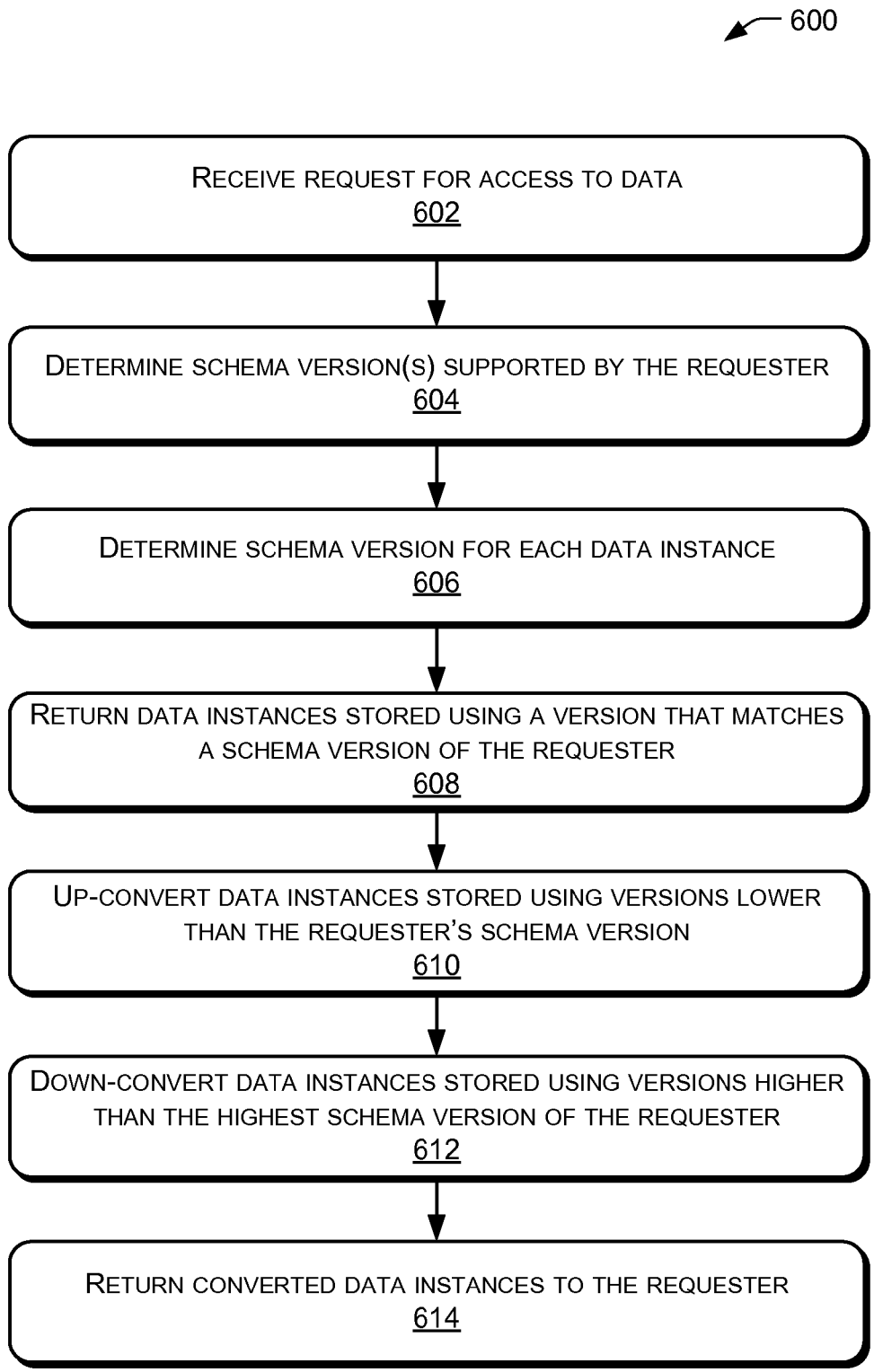
FIG. 6 illustrates a flow diagram of an exemplary process for providing data according to some implementations.

FIG. 6 illustrates a flow diagram of an exemplary process 600 according to some implementations for carrying out the data versioning described above. In the flow diagram, the operations are summarized in individual blocks. The operations may be performed in hardware, or as processor-executable instructions (software or firmware) that may be executed by a processor.

At block 602, a request for access to data is received from a requester. For example, as discussed above, one of the applications registered with the database provider may make a request for access to one or more data instances stored in the database.

At block 604, the schema version(s) supported by the requester are determined. For example, the registration of the requesting application can be checked to determine which schema versions the application is registered as using for each data type included in the request.

At block 606, the schema version is determined for each requested data instance of each data type. Thus, for each data instance that is requested by the requester, the database provider can check the version under which each of the data instances is stored for determining whether or not the version of the data instance matches the schema version used by the requester.

At block 608, the requested data instances that were created in the database using schema versions that match a schema version of the requester are returned to the requester, as no conversion of these data instances is performed.

At block 610, the requested data instances that were created using a schema version lower than a schema version of the requester are up-converted to the schema version of the requester by mapping the data from the version in which it was stored to the version of the requester. Furthermore, when the requester supports multiple schema versions, and there are requested data instances having schema versions between the multiple schema versions supported by the requester, those data instances are up-converted to the next highest schema version supported by the requester, regardless of proximity to a lower schema version supported by the requester.

At block 612, requested data instances that were created using a schema version that is higher than the highest schema version of the requester, are down-converted to the highest schema version of the requester.

At block 614, the converted data instances are returned to the requester.

Data stored in the database is transformed to a version usable by the requester on the fly both transparently and without requiring any action or conversion request on the part of the requester. Thus, the automatic data transformation carried out by the implementations herein is highly useful, especially in devices such as laboratory equipment, exercise equipment, testing equipment, or the like that do not have detailed user interfaces that permit a user to carry out selection of a data type version, or the like. Consequently, implementations herein allow existing applications to keep functioning as normal even after updates have been made to a data type. Further, all versions of data types are retrievable by applications consuming any version of the type.

Implementations herein provide a means for applications to query information about a particular data type version or all versions of a data type, without requiring user re-authorization of applications using existing data type version. Additionally, implementations herein allow existing applications use of instances of newer versions of a data type without changes to their registration. Furthermore, implementations herein are able to maintain the integrity of digitally signed data, and still enable access to the digitally signed data by applications using other versions.

Exemplary Computing Environment

The modules herein, such as the registration module 118, the data versioning module 120, and the applications 116 that create, store, modify and/or retrieve the data in the database can be employed in many different environments and situations. Generally, any of the functions described with reference to the figures can be implemented using software, hardware (e.g., fixed logic circuitry) or a combination of these implementations. The term "logic, "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that performs specified tasks when executed on a processing device or devices (e.g., CPUs or processors). The program code can be stored in one or more computer readable memory devices or other computer readable storage devices. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media," "processor-accessible storage media," or the like, refer to any kind of machine-readable storage medium for retaining information, including the various kinds of storage devices discussed above.

Exemplary Server Computing Device

Figure 7:
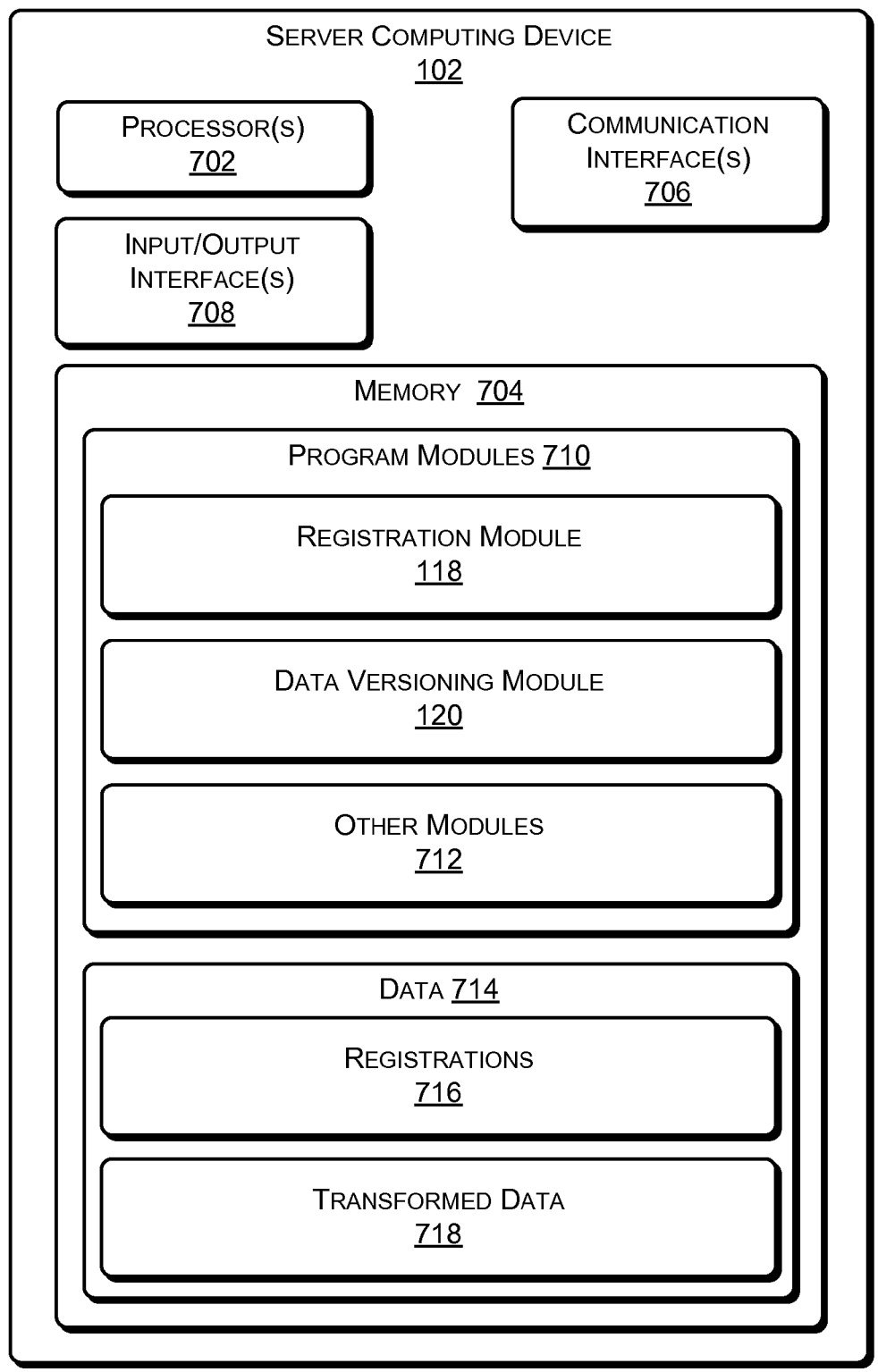
FIG. 7 illustrates an exemplary server computing device according to some implementations.

FIG. 7 illustrates an exemplary configuration of a server computing device 102 for implementing data versioning according to some implementations. In the illustrated example, server computing device 102 includes at least one processor 702 coupled to a memory 704, one or more communication interfaces 706, and one or more input/output interfaces 708. The processor 702 can be a single processing unit or a number of processing units, all of which may include single or multiple computing units or multiple cores. The processor 702 may be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions or processor-accessible instructions stored in the memory 704 or other computer-readable storage media.

The memory 704 can include any computer-readable or processor-accessible storage media known in the art including, for example, volatile memory (e.g., RAM) and/or non-volatile memory (e.g., flash, etc.), mass storage devices, such as hard disk drives, solid state drives, removable media, including external drives, removable drives, floppy disks, optical disks (e.g., CD, DVD), or the like, or any combination thereof The memory 704 stores computer-readable processor-executable program instructions as computer program code that can be executed by the processor 702 as a particular machine configured for carrying out the methods and functions described in the implementations herein.

The communication interface(s) 706 facilitate communication between the server computing device 102 and the client computing devices 104. The communication interface (s) 706 can facilitate communications within a wide variety of networks and protocol types, including wired networks (e.g., LAN, cable, etc.) and wireless networks (e.g., WLAN, cellular, satellite, etc.), the Internet and the like. In one implementation, the server computing device 102 can receive data access requests from client computing devices 104 via the communication interface(s) 706, and the server computing device 102 can send requested data back to the client computing devices 104 via the communication interface(s) 706. Communication interface(s) 706 can also provide communication with external storage (not shown) which may contain data of the database 108, such as in a storage array, network attached storage, storage area network, or the like.

Memory 704 includes a plurality of program modules 710 stored therein and executable by processor 702 for carrying out implementations herein. Program modules 710 include registration module 118 and data versioning module 120, as discussed above. Memory 704 may also include other modules 712, such as an operating system, a database management module, communication software, security and access control modules, drivers, or the like. Furthermore, while registration module 118 and data versioning module 120 are shown as being implemented on the same server computing device 102, in other implementations, these modules may be implemented on separate computing devices.

Memory 704 also includes data 714 that may include registrations 716 for various applications registered to access the database 108. Data 714 may also include transformed data 718, which is data retrieved from database 108 for conversion to transformed data by the data versioning module. In some implementations, server computing device 102 receives request for data from an application, and processor 702 executes the data versioning module 120 to convert and return the requested data. Processor 702 can also execute the registration module 118 for registering applications with the database provider. Further, while exemplary server system architectures have been described, other implementations are not limited to the particular system architectures described herein.

Exemplary Client Computing Device

FIG. 8 illustrates an exemplary configuration of a computing device implementation 800 that can be used to implement the devices or modules described herein, such as any of client computing devices 104. The computing device 800 may include one or more processors 802, a memory 804, communication interfaces 806, a display 808, other input/output (I/O) devices 810, and one or more mass storage devices 812 in communication via a system bus 814. Memory 804 and mass storage 812 are examples of the computer-readable storage media described above for storing instructions which are executed by the processor(s) 802 to perform the various functions described above. For example, memory 804 may generally include both volatile memory and non-volatile memory (e.g., RAM, ROM, or the like). Further, mass storage 812 may generally include hard disk drives, solid-state drives, removable media, including external and removable drives, memory cards, Flash memory, floppy disks, optical disks (e.g., CD, DVD), or the like. Both memory 804 and mass storage 812 may be collectively referred to as memory or computer-readable media herein.

The computing device 800 can also include one or more communication interfaces 806 for exchanging data with other devices, such as via a network, direct connection, or the like, as discussed above. A display 808 may be included as a specific output device for displaying information, such as for displaying requested data to a user, and the like. Other I/O devices 810 may be devices that receive various inputs from the user and provide various outputs to the user, and can include a keyboard, a mouse, printer, audio input/output devices, and so forth.

The computing device 800 described herein is only one example of a computing environment and is not intended to suggest any limitation as to the scope of use or functionality of the computer and network architectures that can implement the features described herein. Neither should the computing device 800 be interpreted as having any dependency or requirement relating to any one or combination of components illustrated in the computing device implementation 800. Thus, in some implementations, computing device 800 can be one or more of client computing devices 104. However, the client computing devices 104 are not limited to the structure illustrated in FIG. 8.

In addition, implementations herein are not necessarily limited to any particular programming language. It will be appreciated that a variety of programming languages may be used to implement the teachings described herein. Further, it should be noted that the system configurations illustrated in FIGS. 1, 7 and 8 are purely exemplary of systems in which the implementations may be provided, and the implementations are not limited to the particular hardware configurations illustrated.

Furthermore, this detailed description provides various exemplary implementations, as described and as illustrated in the drawings. This disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

Conclusion

Implementations described herein provide for transformation of data to a version usable by a requesting application automatically upon receiving the request for the data. The data is transformed transparently and without requiring any conversion request by the requester. Thus, through the implementations provided herein, stored data can remain accessible for long periods of time without becoming obsolete or unreadable.

Although the subject matter has been described in language specific to structural features and/or methodological acts, the subject matter defined in the appended claims is not limited to the specific features or acts described above. Rather, the specific features and acts described above are disclosed as example forms of implementing the claims This disclosure is intended to cover any and all adaptations or variations of the disclosed implementations, and the following claims should not be construed to be limited to the specific implementations disclosed in the specification. Instead, the scope of this patent is to be determined entirely by the following claims, along with the full range of equivalents to which such claims are entitled.

The invention claimed is:

1. A method implemented on a computing device, the method comprising:
    receiving a request from an application to access requested data stored in a database, a first portion of the requested data stored in the database having been created according to a first schema version that is older than a schema version supported by the application and a second portion of the requested data stored in the database having been created according to a second schema version that is newer than the schema version supported by the application of a data type;
    determining the schema version supported by the application;
    determining that the first schema version and the second schema version used to create the requested data are different from the schema version supported by the application; and
    converting the requested data from the first schema version and the second schema version used to create the requested data to the schema version supported by the application to produce converted data.

2. The method according to claim 1, the converting the requested data further comprising mapping data elements of the requested data from the schema version used to store the data to the schema version supported by the application.

3. The method according to claim 1, the converting the requested data further comprising up-converting the first portion of the requested data from the first schema version to the schema version supported by the application and down-converting the second portion of the requested data from the second schema version to the schema version supported by the application.

4. The method according to claim 1, further comprising prior to receiving the request, registering the application with a provider of the database, the registering the application comprising registering one or more schema versions supported by the application.

5. The method according to claim 4, the determining the schema version supported by the application further comprising determining from the registration the schema version supported by the application.

6. The method according to claim 4, the request specifying a schema version that is different than the one or more schema versions registered by the application, the data being converted to the specified schema version as the schema version supported by the application.

7. The method according to claim 1, further comprising providing the converted data to the application in response to the request.

8. Computer-readable storage media containing processor-executable instructions to be executed by a processor for carrying out the method according to claim 1.

9. A method comprising:
    receiving a request for data of a data type from a requester, the data being stored according to a first version of the data type;
    determining a second version of the data type supported by the requester by identifying a registration of the requester;
    transforming, by a processor, the data from the first version to the second version to provide access to the data;

determining that the requester supports multiple versions of the data type; and transforming the data from the first version to the second version comprising determining that the second version is the next highest version of the data type of the multiple versions from the first version.

10. The method according to claim 9, further comprising identifying the registration for the requester of the data, the registration specifying the second version of the data type as being supported by the requester.

11. The method according to claim 10, further comprising prior to receiving the request, registering the requester by registering one or more versions of the data type as being supported by the requester including the second version of the data type.

12. The method according to claim 9, further comprising defining the first version of the data type and the second version of the data type according to extensible markup language (XML) schema versions of the data type.

13. The method according to claim 9, further comprising defining the second version of the data type to include at least one data element not included in the first version of the data type.

14. Computer-readable storage media containing processor-executable instructions to be executed by a processor for carrying out the method according to claim 9.

15. The method according to claim 9, wherein the transforming comprises applying an algorithm created by a data base provider storing the data that up-converts a portion of the requested data from the first version to the second version.

16. A computing device comprising:
 a processor coupled to computer-readable storage media containing instructions executable by the processor;
 a data versioning module implemented by the processor for receiving a request from an application to access data created according to a first version of a data type, the data versioning module identifying that the application uses a second version of a data type, the data versioning module automatically, in response to the request, converting the data to the second version for providing the data to the application;
 a registration module implemented by the processor, the registration module registering the application, the registering comprising determining at least one version of the data type supported by the application; and
 a database storing the data in communication with the processor, the database comprising a plurality of data types, the plurality of data types comprising data stored according to a plurality of versions for each of the data types, the computing device and the database being part of a cloud-based centralized health record storage platform for storing health information for a plurality of individuals.

17. The computing device according to claim 16, further comprising a communication interface for communicating with a plurality of client computing devices, each client computing device including a different application for accessing the data according to a different version of the data type.

18. The computing device according to claim 16 further comprising the first version of the data type and the second version of the data type being extensible markup language (XML) schema versions of the data type.

19. The computing device according to claim 16, the data stored according to the first version being in a digitally signed form, the first version of the data remaining stored in the database in the digitally signed form following the converting.

20. The computing device according to claim 16, wherein the converting by the data versioning module comprises applying at least two versioning algorithms transitively to convert the data from the first version to at least one intermediate version of the data type before conversion to the second version of the data type.

* * * * *